United States Patent
Lee

(10) Patent No.: US 9,561,781 B2
(45) Date of Patent: Feb. 7, 2017

(54) METHOD AND SYSTEM FOR DISPLAYING EFFICIENCY OF REGENERATIVE BRAKING FOR ENVIRONMENTALLY-FRIENDLY VEHICLE

(71) Applicants: Hyundai Motor Company, Seoul (KR); Kia Motors Corporation, Seoul (KR)

(72) Inventor: Chun Hyuk Lee, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 353 days.

(21) Appl. No.: 14/142,026

(22) Filed: Dec. 27, 2013

(65) Prior Publication Data

US 2015/0084760 A1    Mar. 26, 2015

(30) Foreign Application Priority Data

Sep. 26, 2013    (KR) .......................... 10-2013-0114694

(51) Int. Cl.
*B60Q 1/00*      (2006.01)
*B60T 7/04*      (2006.01)
(Continued)

(52) U.S. Cl.
CPC ................. *B60T 7/042* (2013.01); *B60T 1/10* (2013.01); *B60W 30/18127* (2013.01);
(Continued)

(58) Field of Classification Search
CPC ............. B60K 28/00; B60W 30/18127; B60W 2540/10; B60T 7/042; B60T 1/10
(Continued)

(56) References Cited

U.S. PATENT DOCUMENTS

2008/0284242 A1*  11/2008  Ganzel ...................... B60T 7/12
                                                                        303/114.1
2010/0084915 A1*  4/2010  Crombez ............... B60T 13/586
                                                                        303/155
(Continued)

FOREIGN PATENT DOCUMENTS

JP        2009-189074 A      8/2009
JP        2011-167008 A      8/2011
(Continued)

*Primary Examiner* — Daryl Pope
(74) *Attorney, Agent, or Firm* — Mintz Levin Cohn Ferris Glovsky and Popeo, P.C.; Peter F. Corless

(57) ABSTRACT

A method and a system for displaying efficiency of regenerative braking for an environmentally-friendly vehicle to better educate drivers in regards to their braking habits and hopefully teach them how to improve the fuel efficiency of the vehicle through adjustment of their braking habits while improving the quality of a vehicle by displaying the regenerative braking efficiency in comparison to a total amount of braking during the braking of the environmentally-friendly vehicle on a cluster. In particular, a total amount of braking while the vehicle is braking, and a ratio of the amount of regenerative braking included in the total amount of braking is calculated by a controller. Then the controller determines whether the vehicle is stopped due to braking. Once the vehicle has stopped due to braking, the calculated ratio of the amount of regenerative braking is displayed on a cluster in the vehicle.

7 Claims, 7 Drawing Sheets

(51) Int. Cl.
*B60T 1/10* (2006.01)
*B60W 30/18* (2012.01)
*B60W 40/09* (2012.01)
*B60W 50/14* (2012.01)
*B60W 50/00* (2006.01)

(52) U.S. Cl.
CPC ..... *B60W 40/09* (2013.01); *B60K 2350/1092* (2013.01); *B60T 2270/604* (2013.01); *B60W 2050/0089* (2013.01); *B60W 2050/146* (2013.01); *B60W 2540/10* (2013.01); *B60W 2540/12* (2013.01); *B60Y 2300/89* (2013.01)

(58) Field of Classification Search
USPC .......................................... 340/439, 442–447
See application file for complete search history.

(56) References Cited

U.S. PATENT DOCUMENTS

| | | | | |
|---|---|---|---|---|
| 2011/0143320 | A1* | 6/2011 | McCormick | G09B 9/04 434/62 |
| 2012/0031692 | A1* | 2/2012 | Koike | B60K 6/48 180/65.25 |
| 2012/0179346 | A1* | 7/2012 | Aldighieri | B60T 1/10 701/70 |

FOREIGN PATENT DOCUMENTS

| | | |
|---|---|---|
| JP | 2012-106672 A | 6/2012 |
| JP | 2012-229015 A | 11/2012 |
| KR | 10-0193499 | 2/1999 |
| KR | 10-2003-0018867 | 3/2003 |

\* cited by examiner

METHOD AND SYSTEM FOR DISPLAYING EFFICIENCY OF REGENERATIVE BRAKING FOR ENVIRONMENTALLY-FRIENDLY VEHICLE

CROSS-REFERENCE TO RELATED APPLICATION

This application claims priority to and the benefit of Korean Patent Application No. 10-2013-0114694 filed in the Korean Intellectual Property Office on Sep. 26, 2013, the entire contents of which are incorporated herein by reference.

BACKGROUND (a) Field of the Invention

The present invention relates to a method and a system for displaying efficiency of regenerative braking for an environmentally-friendly vehicle, and more particularly, to a method and a system for displaying efficiency of regenerative braking for an environmentally-friendly vehicle to better educate drivers in regards to their braking habits and hopefully teach them how to improve the fuel efficiency of the vehicle through adjustment of their braking habits while improving the quality of a vehicle by displaying an efficiency of the amount of regenerative braking in comparison to a total amount of braking on a cluster while the driver is braking.

(b) Description of the Related Art

As is well known, an environmentally-friendly vehicle generally includes a fuel cell vehicle, an electric vehicle, a plug-in electric vehicle, and a hybrid vehicle, and typically includes therein a motor for generating at least a portion of the driving force.

A hybrid vehicle, which is an example of the environmentally-friendly vehicle uses an internal combustion engine and power of a battery together. That is, the hybrid vehicle efficiently combines and uses power from the internal combustion engine and power of the motor in combination to provide both a sufficient amount of power and fuel efficiency in one vehicle.

The hybrid vehicle includes, for example, as illustrated in FIG. 1, an engine 10, a motor 20, an engine clutch 30 for controlling power between the engine 10 and the motor 20, a transmission 40, a differential gear apparatus 50, a battery 60, an integrated starter-generator 70 for starting the engine 10 or generating electricity by output of the engine 10, and wheels 80.

Further, the hybrid vehicle may include a hybrid control unit (HCU) 200 for controlling an entire operation of the hybrid vehicle, an engine control unit (ECU) 110 for controlling an operation of the engine 10, a motor control unit (MCU) 120 for controlling an operation of the motor 20; a transmission control unit (TCU) 140 for controlling an operation of the transmission 40; and a battery control unit (BCU) 160 for controlling and managing the battery 60.

In some systems, the battery control unit 160 is sometimes referred to in the art as a battery management system (BMS). The integrated starter-generator 70 may be called an integrated starter & generator (ISG), or a hybrid starter & generator (HSG).

The hybrid vehicle may be driven in a driving mode, such as an electric vehicle (EV) mode, which is a true electric vehicle mode using only power from the motor 20, a hybrid electric vehicle (HEV) mode, which uses rotational force from the engine 10 as main power, and uses rotational force from the motor 20 as auxiliary power, and a regenerative braking (RB) mode for collecting braking and inertial energy while braking or inertia of the vehicle through electric generation produced the motor 20 to charge the battery 60.

The hybrid vehicle may display regenerative braking state in a cluster as illustrated in FIG. 2 in order to notify the user of the regenerative braking state while performing regenerative braking of the hybrid vehicle.

A driver may identify a conversion of braking energy to electrical energy according to regenerative braking by viewing the display of the cluster as illustrated in FIG. 2.

Regarding the electrical energy converted according to the regenerative braking, as is well known to those skilled in the art, a larger electrical energy is charged in a battery due to gradual braking in comparison to sudden braking, because the braking ratio to oil pressure is increased during sudden braking requiring a larger amount of braking power. As a result, the ratio of electrical energy obtainable through regenerative braking is decreases relatively.

For example, the relationship between regenerative braking energy converted to electrical energy during sudden braking and gradual braking is represented by graphs shown in FIGS. 3A-B. In particular, FIG. 3A illustrates the relationship between regenerative braking energy converted to electrical energy during gradual braking and FIG. 3B illustrates the relationship between regenerative braking energy converted to electrical energy during sudden braking. However, in an exemplary embodiment of the related art illustrated in FIG. 2, the amount of converted electrical energy is displayed via a thickness of a line connected to the battery, and the thickness of the line is displayed to be larger during sudden braking in the related art. As a result, a driver and/or a user may misinterpret that that thicker line does not correlate to a larger amount of converted electrical energy. In fact, it is just the opposite.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a method and a system for displaying efficiency of regenerative braking for an environmentally-friendly vehicle, which are capable of better educating drivers in regards to their braking habits and hopefully teach them how to improve the fuel efficiency of the vehicle through adjustment of their braking habits and improving the quality of a vehicle by more accurately displaying the efficiency due to regenerative braking compared to a total amount of braking on a cluster in a digital form and/or an analog form while the environmentally-friendly vehicle is braking.

An exemplary embodiment of the present invention provides a method of displaying efficiency of regenerative braking for an environmentally-friendly vehicle, including: calculating, by an active hydraulic boost, a total amount of braking while braking the environmentally-friendly vehicle; calculating, by a controller, a ratio of the amount of regenerative braking included in the total amount of braking; determining, by the controller, whether the environmentally-friendly vehicle is stopped due to the braking; and when the environmentally-friendly vehicle is stopped due to the braking, displaying the calculated ratio of the amount of regenerative braking on a cluster.

In some exemplary embodiments of the present invention, the calculated ratio of the amount of regenerative braking may be displayed on the cluster in an analog method and/or a digital method. Furthermore, calculated ratio of the amount of regenerative braking may be displayed on the cluster in a pop-up form.

Additionally, the calculating of the total amount of braking and the calculating of the ratio of the amount of regenerative braking may be performed based upon receiving a signal from an active hydraulic boost (AHB) of the environmentally-friendly vehicle.

After the calculated ratio of the amount of regenerative braking is displayed on the cluster, when an accelerator pedal of the environmentally-friendly vehicle is operated and a signal of an acceleration of an accelerator pedal position sensor according to the operation of the accelerator pedal is input, the calculated ratio of the amount of regenerative braking may be reset, and the display on the cluster may disappear.

Another exemplary embodiment of the present invention provides a system for displaying efficiency of regenerative braking of an environmentally-friendly vehicle, including: a brake pedal sensor (BPS) configured to detect an operation of a brake pedal; an accelerator pedal sensor (APS) configured to detect an operation of an accelerator pedal; an active hydraulic boost (AHB) configured to calculate a total amount of braking required for braking and the amount of regenerative braying included in the total amount of braking while braking; a cluster configured to display various information about the environmentally-friendly vehicle; and a controller configured to receive signals from the BPS, the APS, and the AHB and display efficiency of regenerative braking of the environmentally-friendly vehicle on the cluster based on the received signals, in which the controller may be operated by a set program for performing the method of displaying efficiency of regenerative braking for the environmentally-friendly vehicle according to the exemplary embodiment of the present invention.

As described above, according to the exemplary embodiments of the present invention, it is possible to promote driving with high fuel efficiency by notifying a driver appropriately of regenerative braking efficiency. In addition, it is possible to increase a high-quality image by providing detailed information about a vehicle to a driver.

DETAILED DESCRIPTION OF THE EMBODIMENTS

Figure 1:
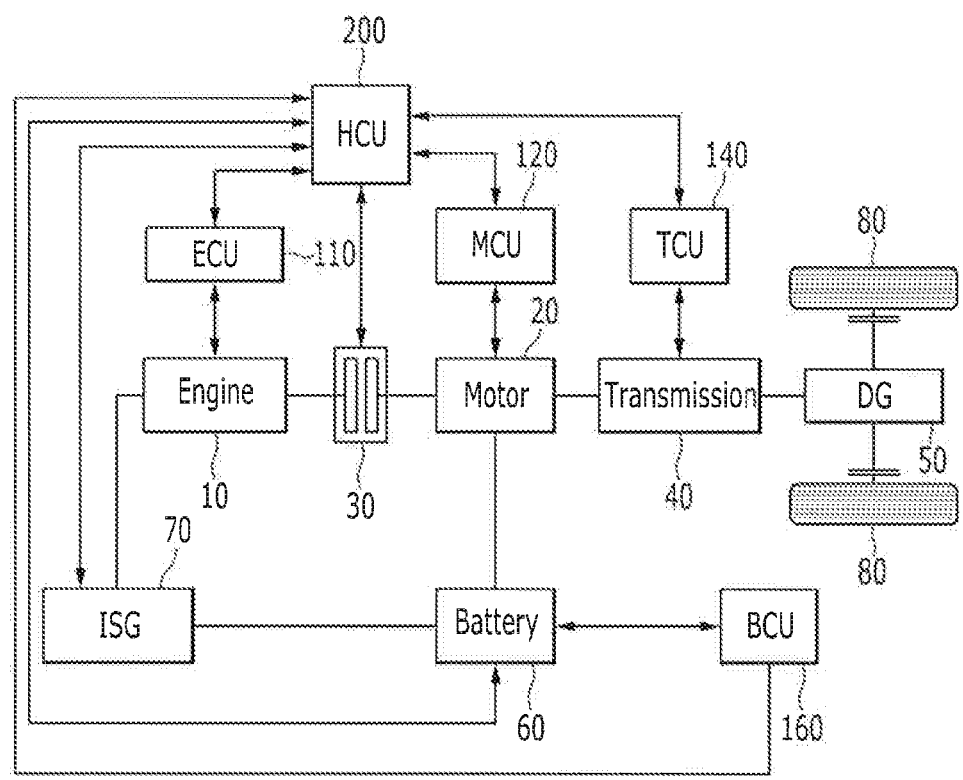
FIG. 1 is a block configuration diagram schematically illustrating a hybrid vehicle, which is an example of an environmentally-friendly vehicle.
Figure 2:
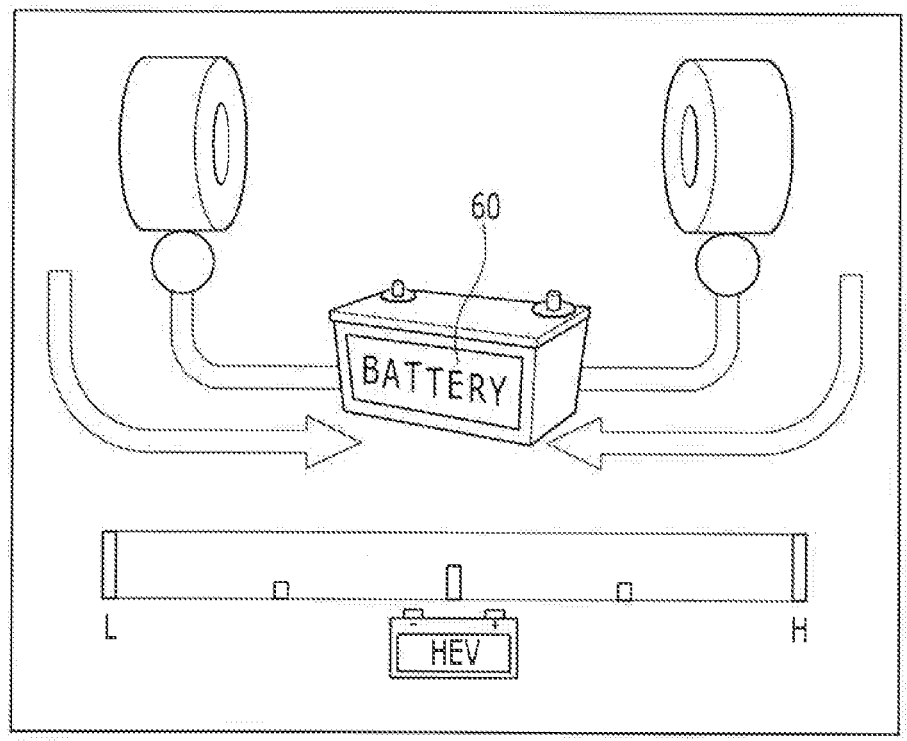
FIG. 2 is a display state of a cluster notifying a regenerative braking state of an environmentally-friendly vehicle.
Figure 3A:
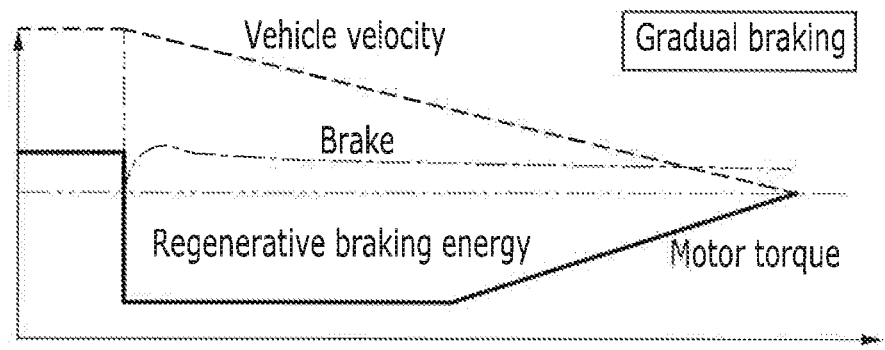
FIGS. 3A-B are graphs illustrating a comparison of a magnitude of electrical energy converted during sudden braking and gradual braking.
Figure 3B:
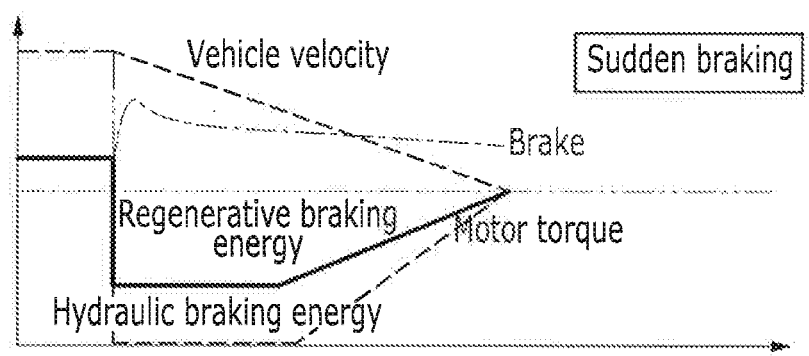

Hereinafter, the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the specification, unless explicitly described to the contrary, the word "comprise" and variations such as "comprises" or "comprising" will be understood to imply the inclusion of stated elements but not the exclusion of any other elements. Like reference numerals designate like elements throughout the specification.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods are executed by at least one controller. The term controller refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a" an and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 4:
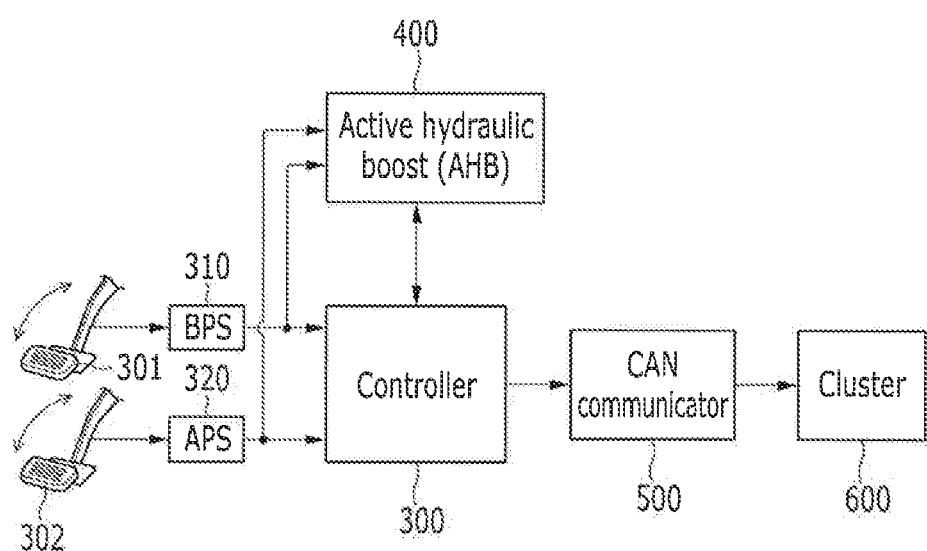
FIG. 4 is a configuration diagram illustrating a system for displaying efficiency of regenerative braking for the environmentally-friendly vehicle according to an exemplary embodiment of the present invention.

FIG. 4 is a block diagram schematically illustrating a system for displaying efficiency of regenerative braking for the environmentally-friendly vehicle according to an exemplary embodiment of the present invention. The system for displaying efficiency of regenerative braking for the environmentally-friendly vehicle according to the exemplary embodiment of the present invention is a system for displaying efficiency of the amount of regenerative braking to a total amount of braking while braking on a cluster.

The system for displaying efficiency of regenerative braking for the environmentally-friendly vehicle according to the exemplary embodiment of the present invention includes: a brake pedal sensor (BPS) that is configured to and senses an operation of a brake pedal 301; an accelerator pedal sensor (APS) 320 that is configured to and detects an operation of an accelerator pedal 302; an active hydraulic boost 400 that is configured to an calculates a total amount of braking required for braking and the amount of regenerative braking included in the total amount of braking during the braking, a cluster 600 that is configured to and displays various information about the environmentally-friendly vehicle; a controller 300 that is configured to and receives signals from the BPS 310, the APS 320, and the AHB 400, and displays on the cluster 600 efficiency of regenerative braking of environmentally-friendly vehicle based on the received signal; and a controller area network (CAN) communicator 500 for transmitting a signal and/or information processed by the controller 300 to the cluster 600.

More specifically, the BPS 310 inputs a signal according to operational force applied to the brake pedal 301 to the controller 300 upon force being applied to the brake pedal 301, and the APS 320 inputs a signal according to operational force applied to the accelerator pedal 302 to the controller 300 during the operation of the accelerator pedal 302.

The AHB 400 and the CAN communicator 500 may be any AHB and a CAN communicator that is typically applied to a vehicle according to the related art, so that detailed descriptions thereof will be omitted.

The cluster 600 utilizes a pop up type format to notify the user of the regenerative braking efficiency, and as such may utilize a cluster that is already utilized in a vehicle according to the related art.

The controller 300, as mentioned above, may be made up of one or more microprocessors operated by a predetermined program and/or a hardware including the microprocessors. Non-transitory program instructions may be executed thereby as a series of commands for performing the method of displaying efficiency of regenerative braking for an environmentally-friendly vehicle according to an exemplary embodiment of the present invention to be described below.

Additionally, in the exemplary embodiment of the present invention, the controller 300 may be included in the AHB 400 or may include the AHB 400. Alternatively, in a case where the controller 300 is applied to the hybrid vehicle, the controller 300 may be included in the hybrid control unit (HCU) 200 illustrated in FIG. 1, or the controller 300 may include the hybrid control unit. Even further, the controller 300 may be included in a body control unit (BCU) (not illustrated) or include the body control unit.

Hereinafter, a method of displaying efficiency of regenerative braking for an environmentally-friendly vehicle according to an exemplary embodiment of the present invention will be described in detail with reference to the accompanying drawings.

Figure 5:
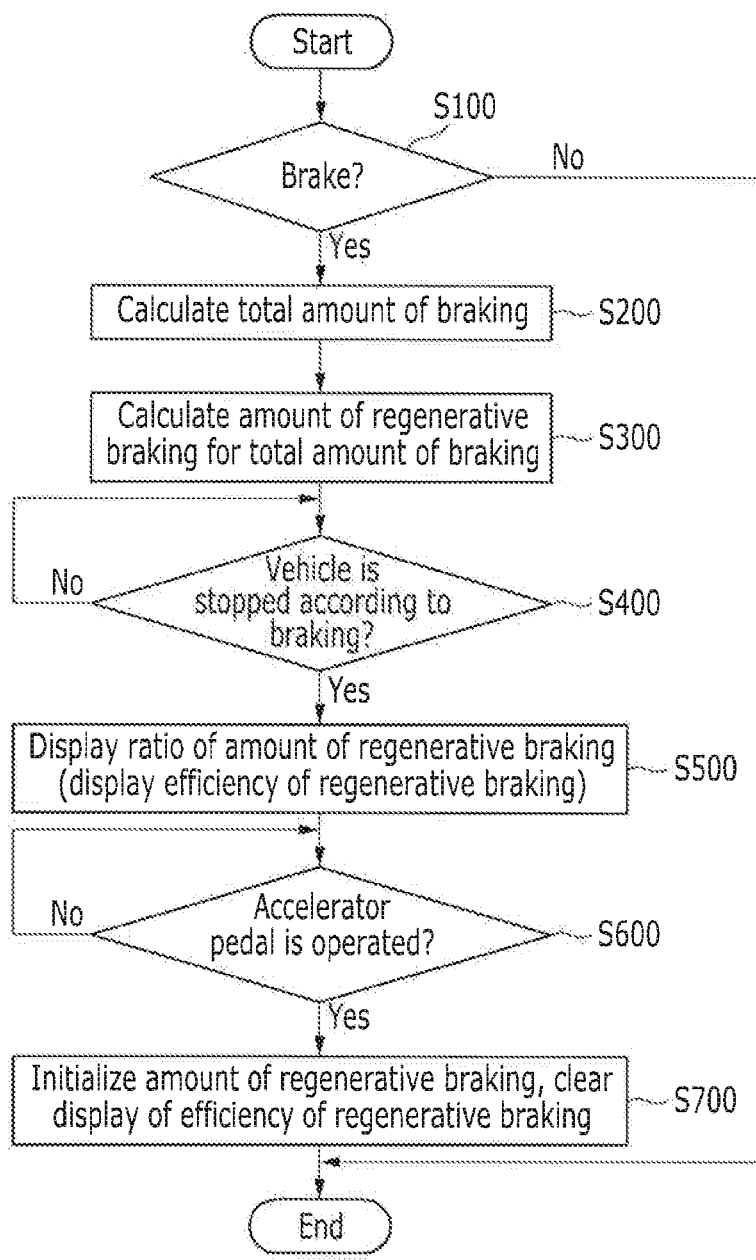
FIG. 5 is a flowchart illustrating a method of displaying efficiency of regenerative braking of an environmentally-friendly vehicle according to an exemplary embodiment of the present invention.

FIG. 5 is a flowchart illustrating a method of displaying efficiency of regenerative braking of an environmentally-friendly vehicle according to an exemplary embodiment of the present invention. As illustrated in FIG. 5, when a driver applies the brakes by stepping on the brake pedal 301, the BPS 310 applies a signal corresponding to operational force applied to the brake pedal 301 to the controller 300 and the AHB 400 (S100).

Once the signal generated by the braking is input to the controller 300 and the AHB 400 from the BPS 310, the controller 300 and/or the AHB 400 calculate a total amount of braking required for the braking based on the input braking signal (S200). The total amount of braking calculated may be, for example, a total amount of braking generally calculated by the AHB 400.

Once the total amount of braking is calculated in step S200, the controller 300 calculates a ratio of the amount of regenerative braking included in the total amount of braking based on the signal of the AHB 400 (S300). Once the ratio of the amount of regenerative braking is calculated, the controller 300 determines whether the environmentally-friendly vehicle has stopped due to the braking (S400).

For example, when a signal of a velocity sensor (not illustrated) of the vehicle is 0, it may be determined that the environmentally-friendly vehicle has stopped. However, it should not be understood that the scope of the present invention is essentially limited thereto.

Once the controller 300 has determined that the environmentally-friendly vehicle is stopped as a result of the determination in step S400, the controller 300 transmits the calculated ratio of the amount of regenerative braking to the cluster 600 through the CAM communicator 500 to be displayed in a pop-up form (S500). A display of the ratio of the amount of regenerative braking displayable on the cluster 600 according to the exemplary embodiment of the present invention is illustrated in FIG. 6.

Figure 6:
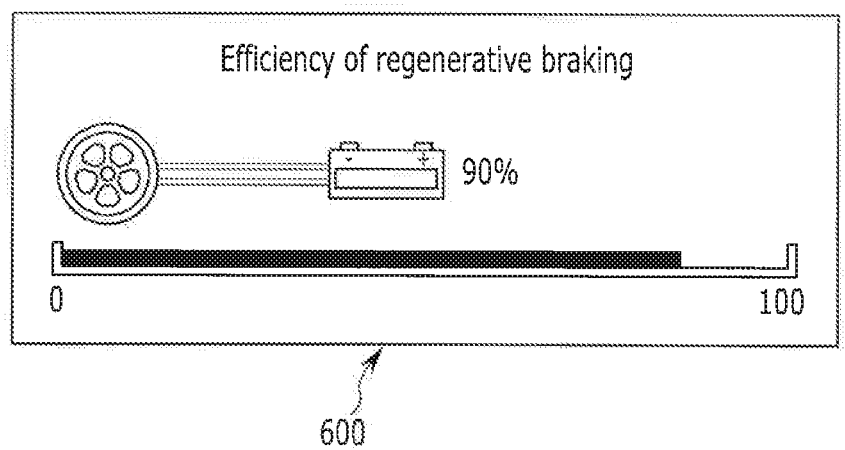
FIG. 6 is an example of a display of efficiency of regenerative braking displayed on a cluster according to the exemplary embodiment of the present invention.

Referring to FIG. 6, the controller 300 may display the ratio of the amount of regenerative braking on the cluster 600 in an analog form and/or a digital form. When a driver operates the accelerator pedal 302 when the ratio of the amount of regenerative braking is displayed as illustrated in FIG. 6, the controller 300 receives a signal according to the operation of the accelerator pedal 302 from the APS 320 to initialize or reset the calculated ratio of the amount of regenerative braking, and clears the display of the ratio of the amount of regenerative braking displayed on the cluster 600 (S600 and S700).

While this invention has been described in connection with what is presently considered to be practical exemplary embodiments, is to be understood that the invention is not limited to the disclosed embodiments, but, on the contrary, is intended to cover various modifications and equivalent arrangements included within the spirit and scope of the appended claims.

DESCRIPTION OF SYMBOLS

300: Controller
310: BPS (brake pedal sensor)
320: APS (acceleration position sensor)
400: Active hydraulic boost (AHB)
600: Cluster

What is claimed is:
1. A method of displaying efficiency of regenerative braking for an environmentally-friendly vehicle, comprising:
   calculating, by a controller, a total amount of braking while braking the vehicle;
   calculating, by the controller, a ratio of an amount of regenerative braking included in the total amount of braking; and displaying, on a display, the ratio of the amount of regenerative braking calculated by the controller, wherein after the calculated ratio of the amount of regenerative braking is displayed on the cluster, once an accelerator pedal of the vehicle is operated and a signal from an acceleration of an accelerator pedal position sensor generated due to the operation of the accelerator pedal is input, the calculated ratio of the amount of regenerative braking is reset, and the display on the cluster disappears.

2. The method of claim 1, wherein:
the calculating of the total amount of braking and the calculating of the ratio of the amount of regenerative braking are performed based upon receiving a signal of an active hydraulic boost (AHB) of the environmentally-friendly vehicle.

3. The method of claim 2, wherein:
the calculated ratio of the amount of regenerative braking is displayed on a cluster in a pop-up form.

4. A system for displaying efficiency of regenerative braking of an environmentally-friendly vehicle, comprising:
a brake pedal sensor (BPS) configured to detect an operation of a brake pedal;
an accelerator pedal sensor (APS) configured to detect an operation of an accelerator pedal;
an active hydraulic boost (AHB) configured to calculate a total amount of braking required for braking and an amount of regenerative braking included in the total amount of braking while braking;
a cluster configured to display various information about the vehicle; and
a controller configured to receive signals from the BPS, the APS, and the AHB, and control display of efficiency of regenerative braking of the vehicle on the cluster based on the received signals, wherein the regenerative braking is displayed on the cluster, once an accelerator pedal of the vehicle is operated and a signal from an acceleration of an accelerator pedal position sensor generated due to the operation of the accelerator pedal is input, the calculated amount of regenerative braking is reset, and the display on the cluster disappears.

5. A non-transitory computer readable medium containing program instructions executed by a processor on a controller, the computer readable medium comprising:
program instructions that calculate a total amount of braking while braking the vehicle;
program instructions that calculate a ratio of an amount of regenerative braking included in the total amount of braking; and
program instructions that display the ratio of the amount of regenerative braking calculated by the controller, wherein after the calculated ratio of the amount of regenerative braking is displayed on the cluster, once an accelerator pedal of the vehicle is operated and a signal from an acceleration of an accelerator pedal position sensor generated due to the operation of the accelerator pedal is input, the calculated ratio of the amount of regenerative braking is reset, and the display on the cluster disappears.

6. The method of claim 5, wherein:
the calculating of the total amount of braking and the calculating of the ratio of the amount of regenerative braking are performed based upon receiving a signal of an active hydraulic boost (AHB) of the environmentally-friendly vehicle.

7. The method of claim 5, wherein:
the calculated ratio of the amount of regenerative braking is displayed on a cluster in a pop-up form.

* * * * *